United States Patent
Schneider et al.

(10) Patent No.: US 7,434,938 B2
(45) Date of Patent: Oct. 14, 2008

(54) DISPLAY DEVICE MOVABLE FOR FRONT AND REAR PROJECTION

(75) Inventors: Robert M. Schneider, Corvallis, OR (US); Daniel R. Dwyer, Battle Ground, WA (US); James R. Cole, Albany, OR (US); James P. Dickie, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 10/970,759

(22) Filed: Oct. 21, 2004

(65) Prior Publication Data
US 2006/0087623 A1 Apr. 27, 2006

(51) Int. Cl.
*G03B 21/22* (2006.01)
*G03B 21/28* (2006.01)
*G03B 3/00* (2006.01)
*G03B 21/56* (2006.01)
*H04N 5/64* (2006.01)

(52) U.S. Cl. .............. 353/77; 353/79; 353/98; 353/101; 353/119; 348/838; 359/443; 359/460; 248/136; 248/472

(58) Field of Classification Search .......... 353/77, 353/79, 122, 121, 30, 31, 69, 70, 98, 99, 353/101, 119, 71; 349/5–8; 359/443, 460, 359/461; 348/744, 838, 787, 788; 248/136, 248/150, 472
See application file for complete search history.

(56) References Cited

U.S. PATENT DOCUMENTS

| | | | |
|---|---|---|---|
| 3,807,847 A | 4/1974 | Okano | 353/71 |
| 3,885,868 A | 5/1975 | Hadzimihalis | 353/71 |
| 4,030,821 A | 6/1977 | Badalich | 353/71 |
| 4,163,610 A | 8/1979 | Sanderson | 353/71 |
| 4,185,899 A | 1/1980 | Sherlock et al. | 352/72 |
| 4,331,397 A * | 5/1982 | Jewison et al. | 353/71 |
| 4,572,632 A | 2/1986 | Bodier et al. | 353/71 |
| 5,090,800 A | 2/1992 | Ushiro | 353/71 |
| 5,285,287 A | 2/1994 | Shikama et al. | 348/745 |
| 5,289,287 A | 2/1994 | Dargis et al. | 358/766 |
| 5,828,427 A * | 10/1998 | Faris | 349/5 |
| 6,137,547 A | 10/2000 | Iijima et al. | 348/789 |
| 6,334,687 B1 * | 1/2002 | Chino et al. | 353/79 |
| 6,525,750 B1 | 2/2003 | Knox | 345/901 |
| 6,637,896 B2 * | 10/2003 | Li et al. | 353/119 |
| 6,652,104 B2 * | 11/2003 | Nishida et al. | 353/70 |
| 6,873,460 B1 * | 3/2005 | Burstyn et al. | 359/461 |

(Continued)

FOREIGN PATENT DOCUMENTS

| | | |
|---|---|---|
| JP | 01-289933 A | 11/1989 |
| JP | 03-201787 | 9/1991 |
| JP | 2003015221 A | 1/2003 |

OTHER PUBLICATIONS

Office Action dated Nov. 30, 2007, Japanese Patent Application No. 2005-306701, 3 pp.

*Primary Examiner*—Melissa Jan Koval

(57) ABSTRACT

A display device has a screen, a housing, a mirror, and a projector. The housing extending away from one side of the screen and has an opening. The mirror is disposed within the housing. The projector is moveable relative to the housing to selectively engage the opening for projection at the mirror and to extend away from a second side of the screen for projection onto a surface.

24 Claims, 6 Drawing Sheets

U.S. PATENT DOCUMENTS

| | | | |
|---|---|---|---|
| 6,877,862 B2* | 4/2005 | Fukunaga et al. | 353/70 |
| 7,021,771 B2* | 4/2006 | Dwyer et al. | 353/79 |
| 7,025,462 B2* | 4/2006 | Dwyer et al. | 353/71 |
| 7,072,002 B2* | 7/2006 | Liao | 348/787 |
| 7,134,756 B2* | 11/2006 | Drucker et al. | 353/77 |
| 2005/0168707 A1* | 8/2005 | Feldpausch et al. | 353/79 |

* cited by examiner

DISPLAY DEVICE MOVABLE FOR FRONT AND REAR PROJECTION

BACKGROUND

Rear projection display devices and projector display devices are useful for displaying images and video streams. Examples of their uses include television and presentations. It is often desirable to have both a rear projection display device and a projector display device in order to take advantage of the best qualities of each. Owning one of each type of these display devices is more expensive and uses a larger amount of space than owning only one of these devices.

DETAILED DESCRIPTION

Figure 1:
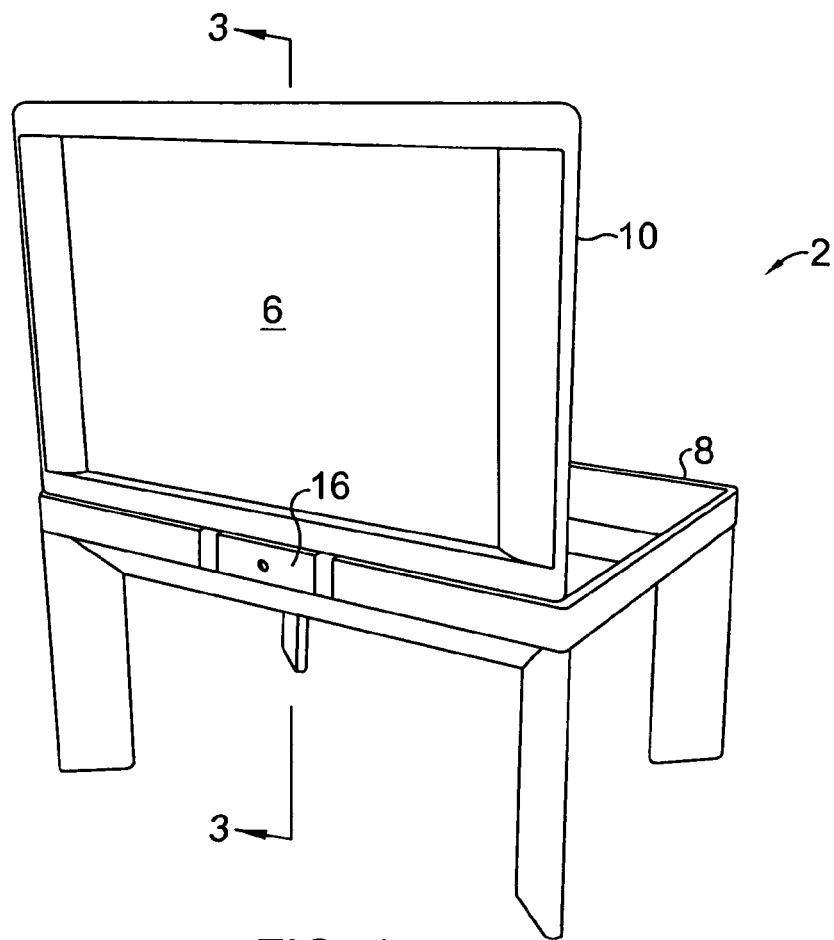
FIG. 1 is a front orthogonal diagram illustrating a first position of one embodiment of the display device for projecting an image alternatively onto a remote surface and a rear projection screen.

FIGS. 1-4 illustrate an embodiment of the display device 2. Display device 2 alternatively projects an image onto remote surface 4 and rear projection screen 6. In one embodiment, the display device 2 includes rear projection screen 6, base 8, housing 10, mirror 12, and projector 14.

Figure 2:
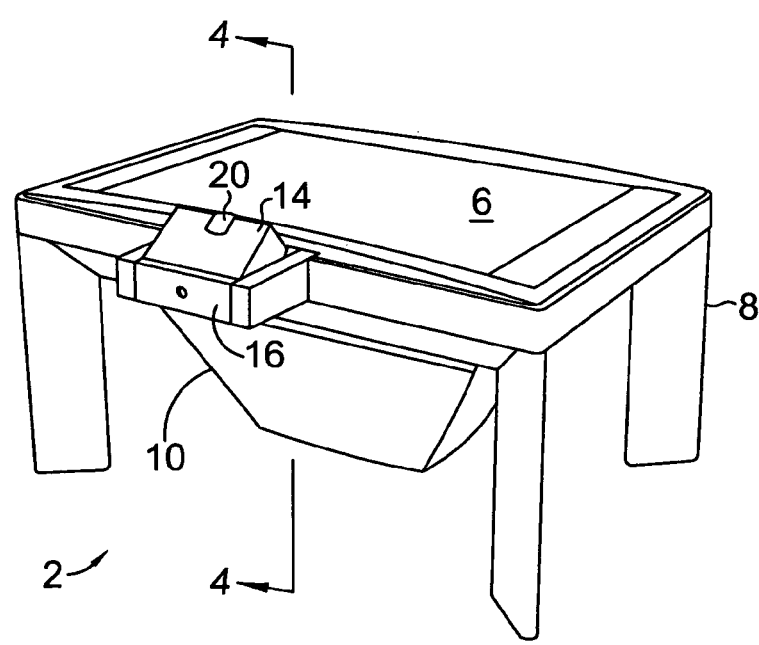
FIG. 2 is a front orthogonal diagram illustrating a second position of the embodiment of the display device shown in FIG. 1.
Figure 4:
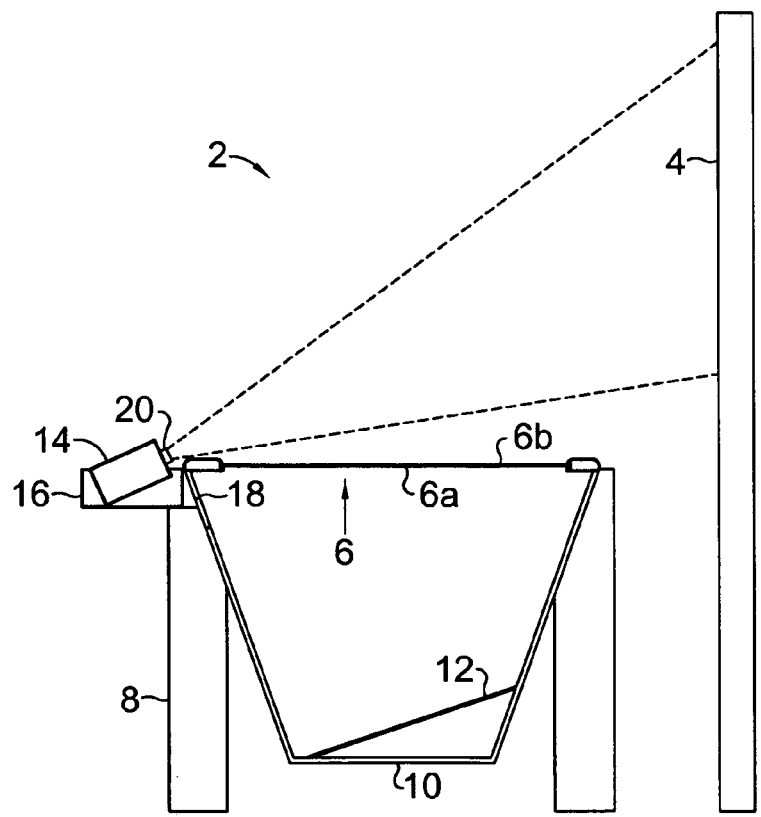
FIG. 4 is a cross-sectional illustration of the embodiment of the display device in the position shown in FIG. 2.

Base 8 supports projector 14 and, in one configuration, rear projection screen 6 and housing 10. Base 8 is any suitable size and shape. In one embodiment, base 8 is shaped to receive housing 10 as shown in FIGS. 2 and 4.

In one embodiment, drawer 16 is supported within base 8. Projector 14 is sized to fit within drawer 16 and configured to partially emerge from drawer 16 to project an image. In one embodiment, projector 16 partially emerges by vertically pivoting within drawer 16.

Rear projection screen 6 is any screen useful for receiving a projection on one side and transmitting the projection through to its other side. As points of reference, screen 6 includes forward side 6a and rearward side 6b. Rear projection screen 6 is mounted on base 8. In one embodiment, rear projection screen 6 is mounted on base 8 indirectly through housing 10. In an alternate embodiment, rear projection screen 6 is mounted directly to base 8.

Figure 3:
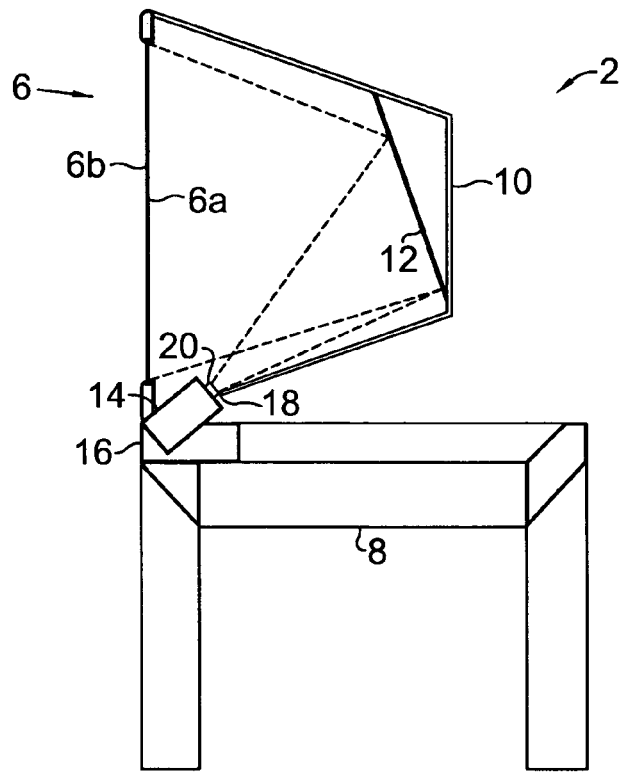
FIG. 3 is a cross-sectional illustration of the embodiment of the display device in the position shown in FIG. 1.

Rear projection screen 6 is either detachable from or moveable on base 8 so that rear projection screen 6 may be disposed out of the projection path of projector 14. In one embodiment where rear projection screen 6 is moveable on base 8, rear projection screen 6 is pivotable on base 8 between an upright position, as shown in FIGS. 1 and 3, and a lowered position, as shown in FIGS. 2 and 4.

Housing 10 extends rearward of rear projection screen 6, or away from side 6a of screen 6. Housing 10 supports mirror 12. In one embodiment, housing 10 encloses mirror 12 and one side of rear projection screen 6.

An opening 18 is formed in housing 10 for receiving projector 14. Projector 14 projects through opening 18 onto mirror 12.

Mirror 12 is any light reflecting surface. Mirror 12 is disposed within housing 10 and angled to reflect light from projector 14 onto rear projection screen 6. Although only one mirror 12 is illustrated in the Figures, any number of mirrors 12 may be used to channel the light from projector 14 onto rear projection screen 6.

Projector 14 is mounted on base 8 and is moveable relative to base 8. In one position, projector 14 engages opening 18 for projection through opening 18 at mirror 12. In another position, projector 14 extends forward of rear projection screen 6, or away from side 6b of screen 6, for projection onto surface 4.

In one embodiment, projector 14 includes a lens 20. Lens 20 is adjustable to focus selectively on rear projection screen 6 and surface 4 depending on the configuration of display device 2.

Figure 5:
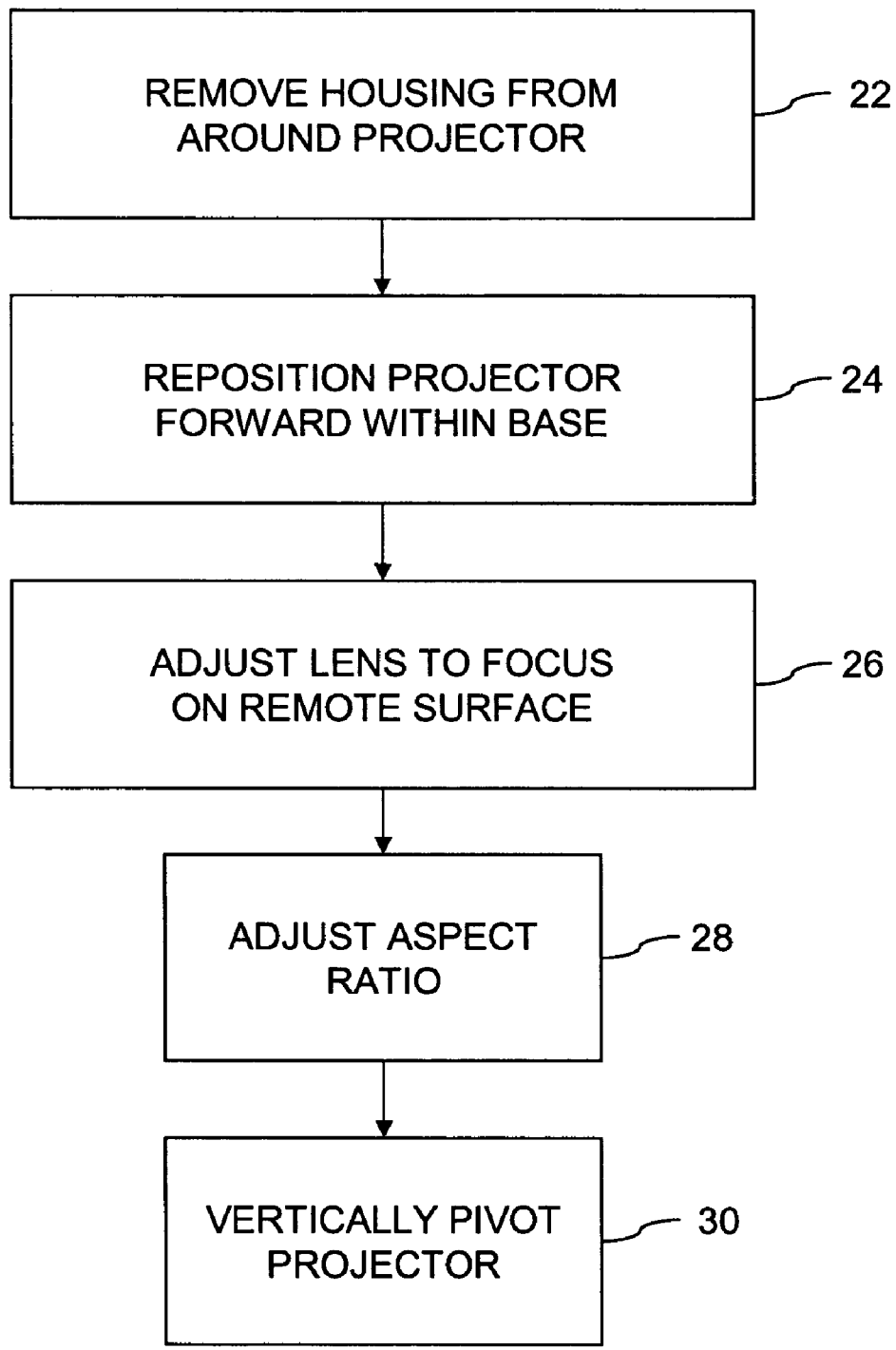
FIG. 5 is a flow chart illustrating one embodiment of a method for converting a display device from a rear projection display device into a front projection display device.

FIG. 5 is a flow chart representing steps of an embodiment of a method. Although the steps represented in FIG. 5 are presented in a specific order, the disclosed subject matter encompasses variations in the order of steps. Furthermore, additional steps may be executed between the steps illustrated in FIG. 5 without departing from the scope of the claimed subject matter.

Housing 10 of display device 2 is removed 22 from around projector 14. In one embodiment, removing 22 housing 10 includes removing housing 10 from base 8. In an alternate embodiment, removing 22 housing 10 of display device 2 from around projector 14 includes pivoting housing 10 on base 8 to expose projector 14.

Projector 14 repositions 24 forward within base 8. In one embodiment, projector 14 repositions 24 within drawer 16. Alternatively, projector 14 repositions 24 without drawer 16.

Additional optional steps may be implemented. For example, in one embodiment, lens 20 of projector 14 is adjusted 26 to focus on surface 4. In another optional step, an aspect ratio of projector 14 is adjusted 28 between 4:3 and 16:9. A further optional step is vertically pivoting 30 projector 14. Projector 14 is vertically pivoted 30 to project onto surface 4.

Figure 6:
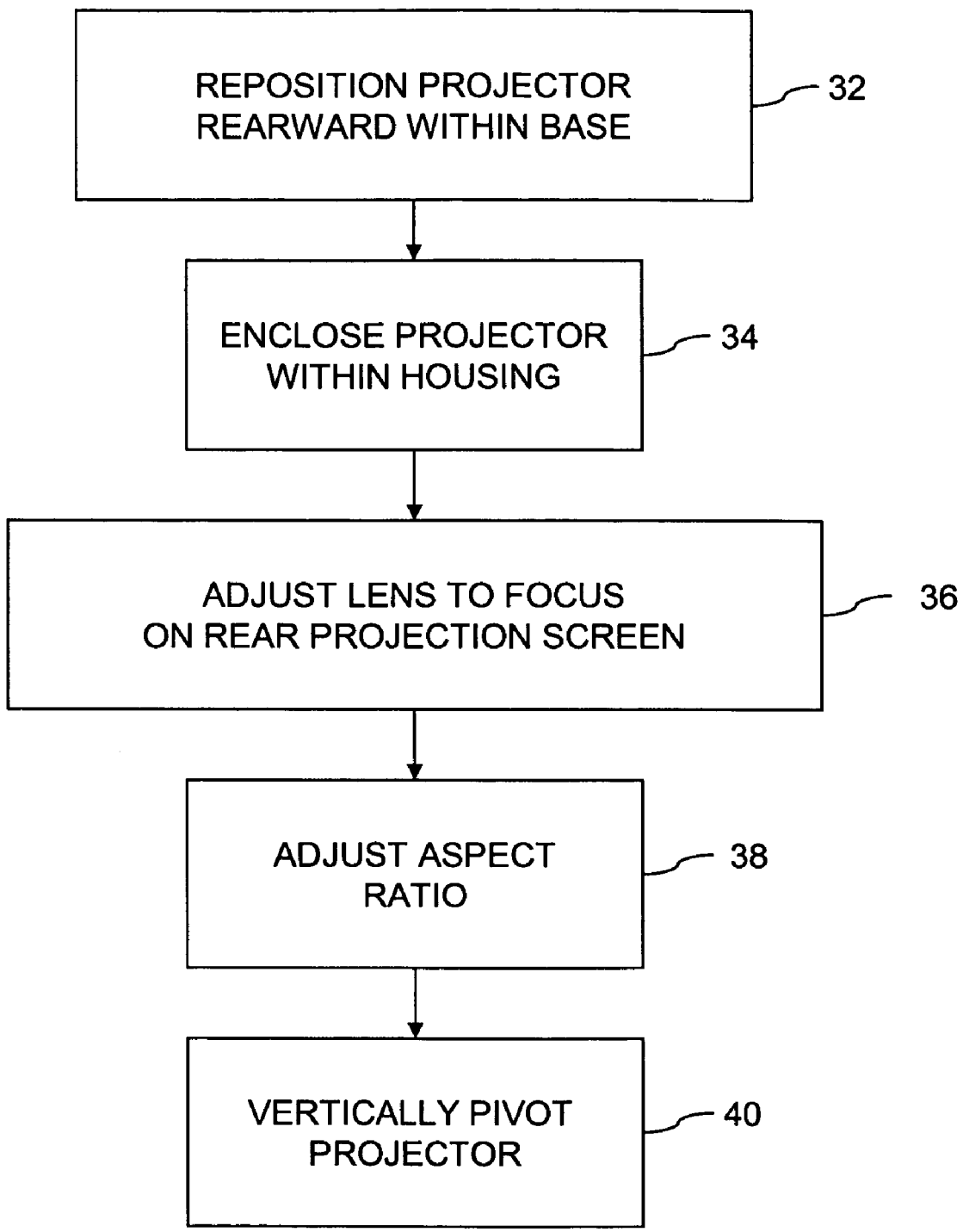
FIG. 6 is a flow chart illustrating one embodiment of a method for converting a display device from a front projection display device into a rear projection display device.

FIG. 6 is a flow chart representing steps of another embodiment of a method, reversing the sequence and effect of the steps in FIG. 5. Although the steps represented in FIG. 6 are presented in a specific order, the disclosed subject matter encompasses variations in the order of steps. Furthermore, additional steps may be executed between the steps illustrated in FIG. 6 without departing from the scope of the claimed subject matter.

Projector 14 repositions 32 rearward within base 8. In one embodiment, projector 14 repositions 32 within drawer 16. Alternatively, projector 14 repositions 32 without drawer 16.

Projector 14 is enclosed 34 within housing 10 of display device 2. In one embodiment, projector 14 is enclosed 34 within housing 10 by mounting housing 10 to base 8 and about projector 14. In an alternate embodiment, projector 14 is enclosed 34 within housing 10 by pivoting housing 10 on base 8 to enclose projector 14.

Additional optional steps may be implemented. For example, in one embodiment, lens 20 of projector 14 is adjusted 36 to focus on rear projection screen 6. In another optional step, an aspect ratio of projector 14 is adjusted 38 between 16:9 and 4:3. A further optional step is vertically pivoting 40 projector 14. Projector 14 is vertically pivoted 40 to project onto rear projection screen 6.

Figure 7:
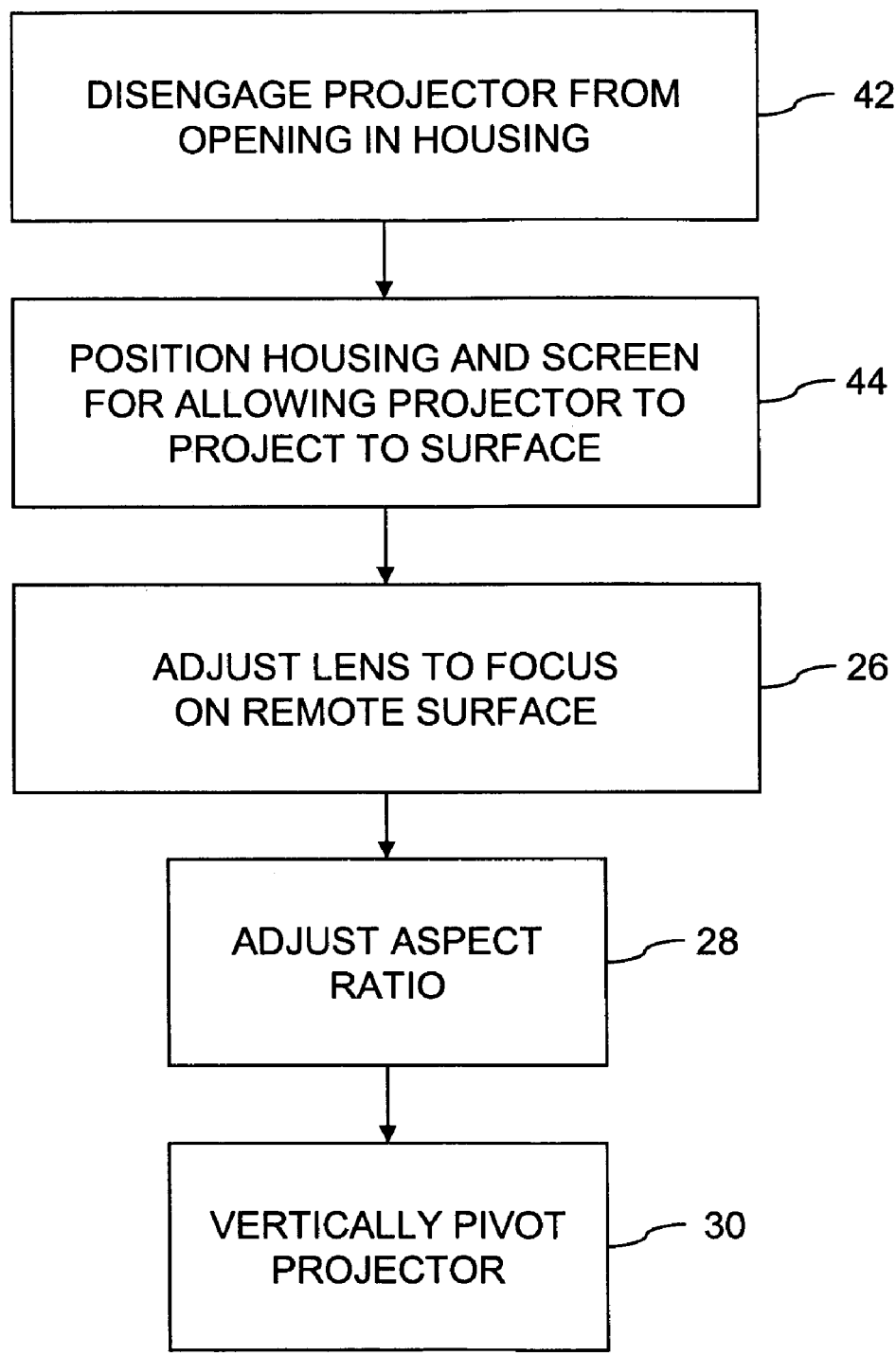
FIG. 7 is a flow chart illustrating another embodiment of a method for converting a display device from a rear projection display device into a front projection display device.

FIG. 7 is a flow chart representing steps of another embodiment of a method. Although the steps represented in FIG. 7 are presented in a specific order, the disclosed subject matter encompasses variations in the order of steps. Furthermore, additional steps may be executed between the steps illustrated in FIG. 7 without departing from the scope of the claimed subject matter.

Projector 14 is disengaged 42 from opening 18 in housing 10. Housing 10 and screen 6 are positioned 44 for allowing projector 14 to project to surface 4. In one embodiment, positioning 44 housing 10 and screen 6 includes removing housing 10 and screen 6 from base 8 to expose projector 14. In an alternate embodiment, positioning 44 housing 10 and screen 6 includes pivoting housing 10 on base 8 to expose projector 14.

Additional optional steps may be implemented. For example, in one embodiment, lens 20 of projector 14 is adjusted 26 to focus on surface 4. In another optional step, an aspect ratio of projector 14 is adjusted 28 between 4:3 and 16:9. A further optional step is vertically pivoting 30 projector 14. Projector 14 is vertically pivoted 30 to project onto surface 4.

Figure 8:
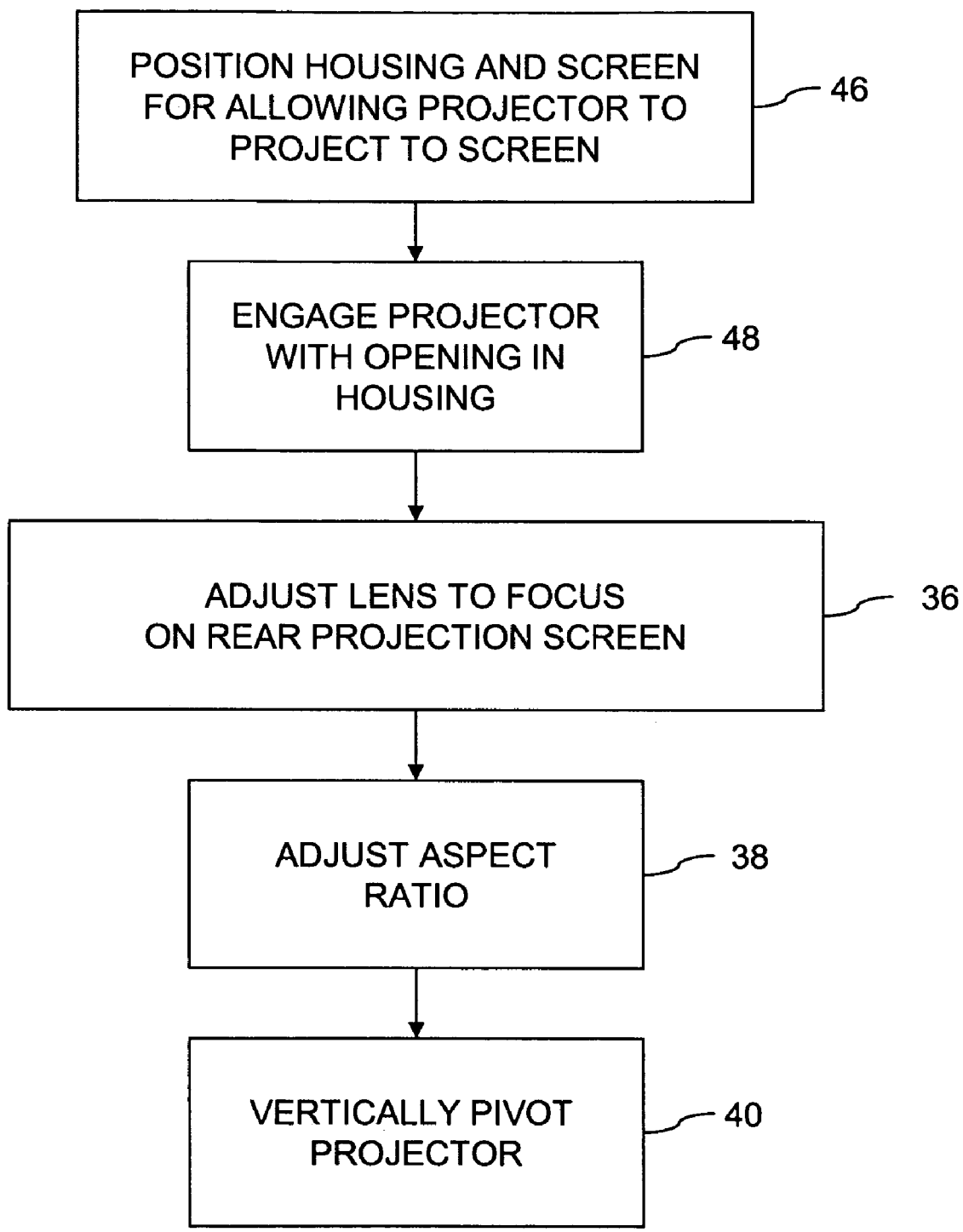
FIG. 8 is a flow chart illustrating another embodiment of a method for converting a display device from a front projection display device into a rear projection display device.

FIG. 8 is a flow chart representing steps of another embodiment of a method, reversing the sequence and effect of the steps in FIG. 7. Although the steps represented in FIG. 8 are presented in a specific order, the disclosed subject matter encompasses variations in the order of steps. Furthermore, additional steps may be executed between the steps illustrated in FIG. 8 without departing from the scope of the claimed subject matter.

Housing 10 and screen 6 are positioned 46 for allowing projector 14 to project to screen 6. In one embodiment, housing 10 and screen 6 are positioned 46 by mounting housing 10 to base 8. In an alternate embodiment, housing 10 and screen 6 are positioned 46 by pivoting housing 10 on base 8. Projector 14 is engaged 48 with opening 18 in housing 10.

Additional optional steps may be implemented. For example, in one embodiment, lens 20 of projector 14 is adjusted 36 to focus on rear projection screen 6. In another optional step, an aspect ratio of projector 14 is adjusted 38 between 16:9 and 4:3. A further optional step is vertically pivoting 40 projector 14. Projector 14 is vertically pivoted 40 to project onto rear projection screen 6.

The foregoing description is only illustrative of some embodiments. Various alternatives and modifications can be devised by those skilled in the art without departing from the claimed subject matter. Accordingly, the claimed subject matter embraces all such alternatives, modifications, and variances.

What is claimed is:

1. A display device, comprising:
   a screen configured to receive a projected image on a first side and transmit the image through to its other side;
   a housing having an opening and extending away from the first side of the screen;
   a mirror disposed within the housing; and
   an image projector moveable relative to the housing to selectively engage the opening for projection at the mirror and to extend away from a second side of the screen for projection onto a surface.

2. The display device of claim 1 further including a base to which the screen is mounted.

3. The display device of claim 2 wherein the screen is pivotable on the base.

4. The display device of claim 2 wherein the screen is detachable from the base.

5. The display device of claim 1 further including a base to which the projector is mounted.

6. The display device of claim 1 wherein the mirror is angled to reflect light from the image projector onto the screen.

7. The display device of claim 1 wherein the image projector is further configured to be moveable relative to the housing to selectively engage the opening for projection through the opening at the mirror.

8. The display device of claim 1 wherein the image projector includes a lens adjustable to focus selectively on the screen and the surface.

9. The display device of claim 1 wherein the image projector is vertically pivotable.

10. A display device for projecting an image alternatively onto a remote surface and a rear projection screen, the display device comprising:
    a base;
    a rear projection screen configured to receive a projected image on a first side and transmit the image through to its other side mounted on the base;
    a housing extending rearward of the rear projection screen, the housing having an opening formed therein;
    an image projector mounted on the base;
    means for selectively engaging the image projector with the opening for projection through the opening at the mirror and extending the image projector forward of the rear projection screen for projection onto the remote surface; and
    means for reflecting light emitted into the housing from the image projector onto the rear projection screen.

11. The display device of claim 10 wherein the means selectively exposing the image projector engaging the image projector within the opening include means for pivoting the rear projection screen and the housing on the base.

12. The display device of claim 10 wherein the means selectively exposing the image projector and engaging the image projector within the opening include means for removing the rear projection screen and the housing from the base.

13. The display device of claim 10 wherein the rear projection screen is detachable from the housing.

14. The display device of claim 10 further including means for focusing light emitted from the image projector selectively on the rear projection screen and the remote surface.

15. The display device of claim 10 further including means for adjusting an aspect ratio of the image projector between 4:3 and 16:9.

16. The display device of claim 10 further including means for vertically pivoting the image projector.

17. A display device, comprising:
    a screen configured to receive a projected image on a first side and transmit the image through to its other side;
    a housing having an opening and attached to the screen with the housing and the screen movable between a first position and a second position; and
    an image projector to engage the opening for projection to the screen with the housing and the screen in the first position and to disengage from the opening for projection onto a remote surface with the housing and the screen in the second position.

18. The display device of claim 17 further including a mirror configured to reflect light from the image projector onto the screen.

19. The display device of claim 17 further including a base to which the screen and housing are pivotally mounted.

20. The display device of claim 17 further including a base upon which the screen and housing are detachably mounted.

21. The display device of claim 17 wherein the image projector is moveable to engage the opening and to disengage from the opening.

22. The display device of claim 17 wherein the image projector includes a lens adjustable to focus selectively on the screen and the remote surface.

23. The display device of claim 17 wherein the image projector is vertically pivotable.

24. A display device, comprising:
a screen configured to receive a projected image on a first side and transmit the image through to its other side;
a housing having an opening and attached to the screen with the housing and the screen movable between a first position and a second position;
means for moving the screen between the first position and the second position;
an image projector to engage the opening for projection to the screen with the housing and the screen in the first position and to disengage from the opening for projection onto a remote surface with the housing and the screen in the second position; and
means for engaging and disengaging the image projector from the opening.

* * * * *

UNITED STATES PATENT AND TRADEMARK OFFICE
CERTIFICATE OF CORRECTION

| | |
|---|---|
| PATENT NO. | : 7,434,938 B2 |
| APPLICATION NO. | : 10/970759 |
| DATED | : October 14, 2008 |
| INVENTOR(S) | : Robert M. Schneider et al. |

Page 1 of 1

It is certified that error appears in the above-identified patent and that said Letters Patent is hereby corrected as shown below:

In column 4, line 8, in Claim 5, after "the" insert -- image --.

Signed and Sealed this

Tenth Day of March, 2009

JOHN DOLL
*Acting Director of the United States Patent and Trademark Office*